(12) United States Patent
Fukushima et al.

(10) Patent No.: US 10,087,560 B2
(45) Date of Patent: Oct. 2, 2018

(54) BRAID

(71) Applicant: TOYOBO CO., LTD., Osaka-shi, Osaka (JP)

(72) Inventors: Yasunori Fukushima, Otsu (JP); Kojiro Hamano, Osaka (JP)

(73) Assignee: TOYOBO CO., LTD., Osaka-shi (JP)

( * ) Notice: Subject to any disclaimer, the term of this patent is extended or adjusted under 35 U.S.C. 154(b) by 629 days.

(21) Appl. No.: 14/432,069

(22) PCT Filed: Sep. 26, 2013

(86) PCT No.: PCT/JP2013/076052
§ 371 (c)(1),
(2) Date: Mar. 27, 2015

(87) PCT Pub. No.: WO2014/050962
PCT Pub. Date: Apr. 3, 2014

(65) Prior Publication Data
US 2015/0247269 A1   Sep. 3, 2015

(30) Foreign Application Priority Data

Sep. 28, 2012  (JP) .................................. 2012-217569

(51) Int. Cl.
| D04C 1/02 | (2006.01) |
| A01K 91/00 | (2006.01) |
| D01F 6/04 | (2006.01) |
| D04C 1/12 | (2006.01) |
| D07B 1/02 | (2006.01) |

(52) U.S. Cl.
CPC ................ *D04C 1/02* (2013.01); *A01K 91/00* (2013.01); *D01F 6/04* (2013.01); *D04C 1/12* (2013.01); *D07B 1/02* (2013.01); *D07B 1/025* (2013.01); *D07B 2201/1096* (2013.01); *D07B 2201/2003* (2013.01); *D07B 2201/2009* (2013.01); *D07B 2205/2014* (2013.01); *D10B 2321/04* (2013.01)

(58) Field of Classification Search
CPC ... D04C 1/02; D04C 1/12; D07B 1/02; D07B 1/025; D01F 6/04; A01K 91/00
See application file for complete search history.

(56) References Cited

U.S. PATENT DOCUMENTS

| 3,968,725 A | * | 7/1976 | Holzhauer | ............... D04C 1/12 57/210 |
| 9,163,341 B2 | * | 10/2015 | Nelis | ..................... A61L 17/04 |
| 2013/0205979 A1 | * | 8/2013 | Nelis | ..................... A61L 17/04 87/7 |

FOREIGN PATENT DOCUMENTS

| JP | 60-47922 B2 | 10/1985 |
| JP | 3-244334 A | 10/1991 |
| JP | 10-317289 A | 12/1998 |
| JP | 2001-303358 A | 10/2001 |
| JP | 2002-155456 A | 5/2002 |
| JP | 2010-148481 A | 7/2010 |
| JP | 2011-241486 A | 12/2011 |

OTHER PUBLICATIONS

International Search Report dated Dec. 17, 2013, issued in corresponding application No. PCT/JP2013/076052.
1st Office Action dated Apr. 2, 2014 issued in the corresponding Japanese patent application No. 2014-506012 w/English translation.

* cited by examiner

*Primary Examiner* — Shaun R Hurley
(74) *Attorney, Agent, or Firm* — Westerman, Hattori, Daniels & Adrian, LLP

(57) ABSTRACT

It is provided that a braid which has high dimensional stability even in long-term high temperature storage and which fluctuates little in physical properties with the lapse of time. And it is provided that fishing lines, nets, ropes, and protective covers, and bulletproof materials using the same. A braid comprising a polyethylene fiber or polyethylene tape which has an intrinsic viscosity [η] of not less than 5.0 dL/g and not more than 30 dL/g and contains not less than 90% of ethylene as a repeating unit thereof, wherein a thermal shrinkage percentage is not less than 0.45% and not more than 8% under an environment of 80° C. for 240 hours.

14 Claims, No Drawings

BRAID

TECHNICAL FIELD

The present invention relates to a braid which has high dimensional stability even in long-term high temperature storage and use and which fluctuates little in physical properties with the lapse of time. More particularly, the invention relates to various kinds of interior cords and nets such as blind cords, pleated cords, pleated screen door cords, curtain cords and shading screens, as well as concrete reinforcement materials, fishing lines, fenders, bulletproof materials, surgical sutures, fastening filaments for meat, safety gloves, safety ropes, ropes for fishery industries, finishing ropes, mooring ropes, pull ropes, archery chords, base materials for collecting organic and inorganic matters using the same.

BACKGROUND ART

A braid composed of multifilaments or monofilaments is used for various use applications such as fishing lines, blind cords and ropes. As a braid is diversified in use applications, the braid is required to have functionalities corresponding to the required characteristics of products. For example, when a braid is used for a fishing line, filaments made of synthetic fibers such as polyamide fibers, polyester fibers and polyolefin fibers and filaments made of fibers of metal such as stainless steel, tungsten metal and amorphous metal have been conventionally known as a general fishing line. A fishing line is required to have various characteristics depending on the kinds of fish for catching and fishing methods, and in general, thin fishing lines having high strength are desirable. Accordingly, braids composed of so-called ultra high molecular weight polyethylene fibers produced by a gel-spinning method are used for providing fishing lines having high strength and high elastic modulus (for example, see Patent Documents 1 and 2). The fishing lines made of ultra high molecular weight polyethylene fibers according to these inventions are fishing lines excellent in high strength and high elastic modulus, but have the problem that dimensional stability and physical characteristics fluctuate along with practical use and the lapse of time. For example, there is the problem that if such fishing lines are used as a fishing line product for a long term, the braided fibers are gradually fastened with the lapse of use time to lose ductility, which is an important factor for fishing lines, and gradual hardening of the fishing lines generates a dimensional change and accordingly causes fluctuation of physical properties. As means for solving the problem, there is disclosed a technique for producing a composite braid with other materials such as polyester monofilaments (for example, see Patent Document 3). Dimensional stability is increased by making a braid to be a composite braid, but use of commonly used polyester fibers leads to lowering of strength and elastic modulus. As other means for solving the problem, there is disclosed a technique for suppressing fluctuation of physical properties by, for example, performing a heat treatment after processing into a braid, but in this case, when a braid is used as a fishing line, there occurs not only the problem that the bundling property of fibers constituting the braid is weak so that the fibers braided are gradually fastened with the lapse of time, but also the problem that the cross sectional shape becomes so flat as to increase the friction with a fishing line guide and to lower wear resistance and throwing characteristics (for example, see Patent Document 4).

On the other hand, as blind cords to be used for blinds moving up and down, a braid has been conventionally used which is obtained by using a twisted yarn made of various kinds of synthetic fibers or natural fibers as a core yarn and coating the core yarn with a braided yarn made of various kinds of fibers, but along with enlargement of blinds, a conventional product cannot be satisfactory for use. Accordingly, it is strongly desired to produce cords more excellent in performance, particularly, in wear resistance. This kind of cord is used for blinds moving up and down, and therefore, it is important that not only dimensional change and untwisting are small even by repetitive use, but also transmissibility for moving up and down operation, that is, a stress at low strain is high. Further, it is also an important factor that fluctuation such as expansion and contract corresponding to change of environments including temperature and humidity is small for a long-term.

In the conventional techniques, there is not only the problem relevant to long-term use of a product but also the problem relevant to product storage. For example, there is the problem that physical properties which a product originally has fluctuate when the product is stored for a long-term in a warehouse without air conditioning equipment or is put in environments having large temperature fluctuation for a long-term such as inside a carrier for product transport or inside a ship container. The disclosed techniques described above cannot presently suppress dimensional change and fluctuation of physical properties with the lapse of time not only during use of a product but also during product storage.

PRIOR ART DOCUMENT

Patent Documents

Patent Document 1: Japanese Examined Patent Publication Syo-60-47922
Patent Document 2: JP-A-Hei-3-244334
Patent Document 3 JP-A-2002-155456
Patent Document 4: JP-A-Hei-10-317289

SUMMERY OF THE INVENTION

Problems to be Solved by the Invention

An object of the present invention is to solve the above-mentioned conventional problems. The invention aims to provide a highly functional braid which has high dimensional stability and high physical property retention rate even in long-term use and storage and which is usable as fishing lines, nets, ropes, and protective covers by producing fibers through spinning and drawing steps, and not only properly controlling a formation step of the fibers but also precisely controlling tension at a cooling step after the drawing step as well as tension at the time of winding after the cooling step, and further temperature and tension at the time of a braid production of producing a braid using the fibers.

Solutions to the Problems

The inventors of the present invention have made earnest investigations on deformation conditions at the time of spinning and drawing in a solid state, cooling conditions after the drawing step, winding conditions, as well as not only temperature conditions and tension conditions in a braid production step for making a braid but also the structure, shrinkage percentage, thermal stress, stability of physical properties of a braid to be obtained, and have consequently completed the present invention.

The present invention has the following aspects.

1. A braid comprising a polyethylene fiber or polyethylene tape which has an intrinsic viscosity [η] of not less than 5.0 dL/g and not more than 30 dL/g and contains not less than 90% of ethylene as a repeating unit thereof, wherein a thermal shrinkage percentage is not less than 0.45% and not more than 8% under an environment of 80° C. for 240 hours.

2. A braid comprising a polyethylene fiber or polyethylene tape which has an intrinsic viscosity [η] of not less than 5.0 dL/g and not more than 30 dL/g and contains not less than 90% of ethylene as a repeating unit thereof, wherein a tensile strength retention rate is not less than 85% and not more than 115% under an environment of 80° C. for 240 hours.

3. The braid according to above 1 or 2, wherein a stress at the time of 1% elongation is not less than 0.5 cN/dtex and not more than 20 cN/dtex.

4. The braid according to any one of above 1 to 3, wherein a shrinkage stress at not lower than 30° C. and not higher than 80° C. is not more than 5.0 cN/dtex when measured by a thermo-mechanical analyzer (TMA).

5. The braid according to any one of above 1 to 4, wherein a loop strength retention rate is not less than 15% when measured in accordance with JIS L-1013.

6. The braid according to any one of above 1 to 5, wherein the braid is constituted from not less than 3 fibers and at least one fiber constituting the braid is a polyethylene fiber.

7. A braid constituted from at least one polyethylene fiber having an intrinsic viscosity [η] of not less than 5.0 dL/g and not more than 30 dL/g, and comprising not less than 90% of ethylene as a repeating unit thereof, and having a storage modulus at not lower than 30° C. and not higher than 80° C. of not less than 70 cN/dtex when measured by a solid viscoelasticity measurement apparatus after the braid is un-braided.

8. A braid constituted from at least one polyethylene fiber having an intrinsic viscosity [η] of not less than 5.0 dL/g and not more than 30 dL/g, and comprising not less than 90% of ethylene as a repeating unit thereof, and having a shrinkage stress at not lower than 30° C. and not higher than 80° C. of not more than 5.0 cN/dtex when measured by a thermo-mechanical analyzer (TMA) after the braid is un-braided.

9. The braid according to any one of above 1 to 8, wherein a specific gravity is not less than 0.80 and not more than 2.0 and an average tensile strength is not less than 8 cN/dtex and not more than 50 cN/dtex.

10. The braid according to above 9, wherein the braid is colored.

11. The braid according to any one of above 1 to 10, wherein the braid is drawn at a draw ratio of not less than 1.05 times and not more than 15.0 times at not higher than 160° C. after braid production.

12. A fishing line using the braid according to any one of above 1 to 11.

13. A rope using the braid according to any one of above 1 to 11.

14. A method for producing a braid, comprising
spinning a polyethylene which has an intrinsic viscosity [η] of not less than 5.0 dL/g and not more than 30 dL/g and contains not less than 90% of ethylene as a repeating unit thereof,
drawing the polyethylene at temperature of not lower than 80° C.,
cooling the drawn filament at a cooling speed of not lower than 3° C./sec,
winding up the obtained drawn filament at a tension of 0.001 to 7 cN/dtex to prepare a polyethylene fiber,
twisting the polyethylene fiber if necessary, and
adjusting, in a subsequent braid production step, a time for heating the polyethylene fiber constituting the braid to a temperature of not lower than 70° C. to not longer than 30 minutes and a tension applied to the polyethylene fibers during the heating to not less than 0.005 cN/dtex and not more than 15 cN/dtex.

Effect of the Invention

The braid of the present invention is characterized by having high dimensional stability and small fluctuation of physical properties for practical use and with the lapse of time in a wide temperature range for use as a product. The braid of the invention exhibits excellent performance for use as fishing lines, various kinds of interior cords and nets such as blind cords, pleated cords, pleated screen door cords, curtain chords and shading screens, all of which being required for moving up and down and opening and closing, fenders, surgical sutures, fastening filaments for meat, safety gloves, safety ropes, ropes for fishery industries, finishing ropes, archery chords, etc. The braid of the invention further exhibits excellent performance not only for use as the above-mentioned molded products but also as base materials for collecting organic and inorganic matters by making composites with various kinds of materials as well as water-retaining base materials, and the braid is thus widely usable.

Mode for Carrying Out the Invention

Hereinafter, the present invention will be described in detail. In a polyethylene fiber to be used for the braid, a tensile strength is preferably not less than 13 cN/dtex. It is more preferably not less than 20 cN/dtex and furthermore preferably not less than 25 cN/dtex. The upper limit of the tensile strength is not particularly limited, but it is difficult to obtain a polyethylene fiber having a tensile strength exceeding 60 cN/dtex in terms of technique and industrial production. An initial elastic modulus is preferably not less than 250 cN/dtex and not more than 2300 cN/dtex. It is more preferably not less than 350 cN/dtex and furthermore preferably not less than 550 cN/dtex, and more preferably not more than 1800 cN/dtex and furthermore preferably not more than 1600 cN/dtex. If the polyethylene fiber has the tensile strength and the initial elastic modulus as described above, breakage from an external force applied in a product processing step is hardly caused. The measurement methods for the tensile strength and the initial modulus will be described in detail in examples.

In a high strength polyethylene fiber constituting the braid of the present invention, an intrinsic viscosity is preferably 5.0 to 30 dL/g, more preferably 7.0 to 28 dL/g, and furthermore preferably 10 to 24 dL/g. If the intrinsic viscosity is not more than 4.9 dL/g, a fiber cannot be obtained which is excellent in dimensional stability, which fluctuates little in physical properties with the lapse of time, and which has a tensile strength of not less than 10 cN/dtex. On the other hand, if the intrinsic viscosity exceeds 30 dL/g, it is extremely difficult for formation into a fibrous shape, and therefore it is not preferable. If the intrinsic viscosity is not less than 5.0 dL/g, reduction of terminal groups of a polyethylene molecule leads to reduction of the number of structural defects in a product. As a result, physical properties such as tensile strength and elastic modulus and wear resistant performance can be improved.

The polyethylene preferably has a weight average molecular weight of not less than 700000 and not more than 8000000. It is more preferably not less than 800000 and not more than 7000000, and furthermore preferably not less than 900000 and not more than 6000000. If the weight average molecular weight is less than 700000, in the case of being used in the form of a braid, not only the fiber tends to become fluffy due to local friction, but also it becomes difficult to obtain the tensile strength and the elastic modulus as described later as a braid, and therefore it is not preferable. On the other hand, if the weight average molecular weight exceeds 8000000, not only it becomes difficult to obtain a filament even by a solvent forming, which is a production method of the present invention, but also the obtained filament itself is not provided with ductility so that a fishing line or the like made of a braid may lose flexibility and may give unpleasant feeling of use. As a method for measuring a weight average molecular weight, a GPC measurement method may be generally employed for polyethylene having low molecular weight, but in the case of polyethylene having high weight average molecular weight as in the case of the present invention, the weight average molecular weight cannot be measured easily by the GPC measurement method since clogging or the like occurs in columns at the time of the measurement. Accordingly, the weight average molecular weight can be measured based on the value of the intrinsic viscosity according to the following equation disclosed in "Polymer Handbook Fourth Edition, Chapter 4, JOHN WILEY, 1999".

$$\text{Weight average molecular weight}=5.365\times10^4\times(\text{intrinsic viscosity})^{1.37}.$$

The high strength polyethylene fiber constituting the braid of the present invention substantially contains ethylene as a repeating unit thereof. Further, in a range in which effects of the present invention can be obtained, not only an ethylene homopolymer but also a copolymer of ethylene and a small amount of another monomer such as α-olefins, acrylic acid and derivatives thereof, methacrylic acid and derivatives thereof, and vinyl silane and derivatives thereof can be used. The polyethylene fiber may be the mixture of the copolymers, an ethylene homopolymer and another copolymer, a blend of an ethylene homopolymer and a homopolymer such as other α-olefins. The polyethylene fiber may contain a partial crosslinked structure. In addition, the polyethylene fiber may be a blend of polyethylenes having different weight average molecular weights such as a blend of high density polyethylene and ultra high molecular weight polyethylene, a blend of low density polyethylene and ultra high molecular weight polyethylene, or a blend of low density polyethylene, high density polyethylene, and ultra high molecular weight polyethylene as long as an intrinsic viscosity of the fiber measured by the method described below satisfies the above-mentioned range. The polyethylene fiber may be a blend of two or more kinds of ultra high molecular weight polyethylenes having different weight average molecular weights. Further, the polyethylene fiber may be a blend of polyethylenes having different molecular weight distributions as long as an intrinsic viscosity of the fiber measured by the method described below satisfies the above-mentioned range.

However, if the content of monomers other than ethylene is too high, it may contrarily be an inhibition factor for drawing. Accordingly, in terms of obtaining a high strength fiber, the content of another monomer such as α-olefin is preferably not more than 5.0 mol %, more preferably not more than 1.0 mol %, and furthermore preferably not more than 0.2 mol % as a monomer unit. No need to say, an ethylene homopolymer may be used.

A method for producing a high strength polyethylene fiber constituting the braid of the present invention is not particularly limited, but a solvent forming method shown below is preferable. There are some methods known as the solvent forming method, and the solvent forming method is not particularly limited, however, it is preferable to employ a solution spinning method in which polyethylene is dissolved in a volatile organic solvent such as decalin or tetralin or in a non-volatile solvent such as paraffin, the solvent serving as a solvent for polyethylene, and the resulting solution is formed into a fibrous shape. Besides the solvent forming method, methods employable may be a melt extrusion method and a method in which a film-like molded body obtained by compression forming at melting point or lower is split (cut) to be formed into a tape or a fiber.

The solvent to be used at the time of producing the polyethylene fiber in the present invention is a solvent capable of dissolving polyethylene, and preferably a solvent having a boiling point not lower than the melting point of the polyethylene, and further preferably a solvent having a boiling point not lower than the melting point of the polyethylene +20° C. Specific examples of the solvent include, in addition to decalin, tetralin, and paraffin as described above, aliphatic hydrocarbon solvents such as n-nonane, n-decane, n-undecane, n-dodecane, n-tetradecane, n-octadecane, paraffin and kerosene; aromatic hydrocarbon solvents such as xylene, naphthalene, tetralin, butylbenzene, p-cymene, cyclohexylbenzene, diethylbenzene, pentylbenzene, dodecylbenzene, bicyclohexyl, methylnaphthalene and ethylnaphthalene, and their hydrogenated derivatives; halogenated hydrocarbon solvents such as 1,1,2,2-tetrachloroethane, pentachloroethane, hexachloroethane, 1,2,3-trichloropropane, dichlorobenzene, 1,2,4-trichlorobenzene and bromobenzene; and mineral oils such as paraffin-based process oil, naphthene-based process oil and aromatic process oil. A paraffin wax to be used is not limited particularly to a compound composed only of carbon and hydrogen, and may contain a small amount of oxygen and other elements. The paraffin wax contains mainly a saturated aliphatic hydrocarbon compound, and specific examples of the paraffin wax include n-alkanes having a carbon number of not less than 22 such as docosane, tricosane, tetracosane and triacontane and mixtures containing mainly these components and lower n-alkanes; so-called paraffin waxes separated from petroleum, followed by refining; polyethylene waxes produced by a moderate/low pressure method, which are low molecular weight polymers obtained from ethylene or by copolymerization of ethylene and another α-olefin; polyethylene waxes produced by a high pressure method; ethylene copolymer waxes; waxes in which their molecular weights are reduced by thermally modifying polyethylene such as polyethylene obtained by a moderate/low pressure method or polyethylene obtained by a high pressure method; oxidized waxes such as oxides of these waxes and maleic acid-modified waxes; and maleic acid-modified waxes.

At the time of dissolution, the concentration of polyethylene is preferably not less than 0.5 wt % and not more than 40 wt %, more preferably not less than 2.0 wt % and not more than 30 wt %, and furthermore preferably not less than 4.0 wt % and not more than 20 wt %. If the concentration of polyethylene is less than 0.5 wt %, production efficiency is extremely deteriorated, and therefore it is not preferable. On the other hand, if the concentration of polyethylene exceeds 40 wt %, discharging from nozzle as will be described below becomes difficult in a solvent spinning method due to extreme high molecular weight, and therefore it is not preferable.

The highly functional polyethylene fiber constituting the braid of the present invention may be obtained by evenly dissolving the above-mentioned polyethylene solution at a temperature higher than the melting point by not lower than 10° C., more preferably not lower than 20° C., furthermore preferably not lower than 30° C. by using an extruder or the like, extruding the resulting solution, and supplying the solution to a spinning nozzle (spinneret) using a quantitatively supplying apparatus.

Thereafter, the solution is discharged at not less than 0.1 g/min of through put out of a nozzle orifice having a diameter of 0.2 to 3.5 mm, preferably 0.5 to 2.5 mm. Successively, the discharged molded body is cooled to 5 to 60° C. and thereafter wound at 800 m/min. In the stage of spinning, it is preferable to adjust the temperature of the spinneret to a temperature higher than the melting point of polyethylene by not lower than 10° C. and the boiling point of the solvent employed. In a temperature range close to the melting point of polyethylene, the viscosity of the polymer is too high so that the molded body cannot be wound at high speed. On the other hand, if the temperature of the spinneret is adjusted to higher than the boiling point of the solvent employed, the solvent is boiled immediately after the solution is discharged out of the spinneret so that filaments are often cut vertically below the spinneret, and therefore it is not preferable. A cooling method may be a dry quenching method using an inert gas such as air or nitrogen, or may be a cooling method using a miscible liquid or an immiscible liquid such as water.

The discharged gel filament is deformed at a magnification of not less than 1.1 times and not more than 100 times until the discharged gel filament is completely thinned in the cooling step. The deformation magnification is preferably not less than 2.0 times and not more than 80 times, and more preferably not less than 5.0 times and not more than 50 times. At that time, it is important to set the time required for deformation to within 3 minutes. It is preferably within 2 minutes and more preferably within in 1 minute. If the time required for deformation exceeds 3 minutes, the polyethylene molecular chains in the inside of the discharged gel filament are relaxed, and therefore not only a braid having high strength and high elastic modulus cannot be obtained but also dimensional stability and high tensile strength or elastic modulus, which are characteristic properties of the braid of the present invention, are not compatible with each other. Consequently, it is not possible to obtain a physical property retention rate which is small in change with the lapse of time and which is desired for such applications, and therefore it is not preferable. In this case, a portion of the solvent may be removed from the discharged gel filament during the deformation process for the discharged gel filament.

An undrawn filament obtained through cooling is heated, and subjected to drawing several times while the solvent is removed, and may be subjected to multistage drawing. Means for removing the solvent may be the above-mentioned heating method in the case of using a volatile solvent, but may be a method for extracting the solvent using an extracting agent or the like in the case of using a non-volatile solvent. Examples of the extracting agent may include chloroform, benzene, trichlorotrifluoroethane (TCTFE), hexane, heptane, nonane, decane, ethanol and higher alcohol. A heat medium to be used in the drawing step may be an inert gas such as air or nitrogen, water vapor, a liquid medium or the like, and the drawing may be carried out using heating rollers. In this case, there is no need to carry out the solvent removal step and the drawing step for the undrawn filament at the same time, and after dried, the undrawn filament may be drawn in one or more stages. No need to say, the drawing may be carried out while removing the solvent. One important constituent for producing the braid of the present invention is a concentration of a residual solvent in the fiber before the braid production step. The concentration of a residual solvent is preferably not less than 0.1 ppm and not more than 10000 ppm. The concentration is preferably not less than 1 ppm and not more than 8000 ppm, and furthermore preferably not less than 10 ppm and not more than 5000 ppm. If the concentration of a residual solvent in the fiber exceeds 10000 ppm, the time for relaxation of the molecular chains in the fiber at the time of heating in the braid production step is too fast so that prescribed tension as will be described below cannot be obtained, and therefore it is not preferable. On the other hand, if it is less than 0.1 ppm, the time for relaxation of the molecular chains in the fiber is slow and fastening of the fibers is insufficient at the time of heating in the braid production step. This does not make it possible to obtain a braid which has high dimensional stability and which fluctuate little in physical properties with the lapse of time even during long-term use, and therefore it is not preferable.

A method for drawing a polyethylene fiber constituting the braid of the present invention is one of important factors in the braid production method of the present invention. The deformation speed at the time of drawing is preferably not less than $0.001^{-1}$ and not more than $0.8$ s$^{-1}$. It is more preferably not less than $0.01$ s$^{-1}$ and not more than $0.1$ s$^{-1}$. The deformation speed may be calculated from the draw ratio of the fiber, the draw speed, and the length of the draw interval. That is, the deformation speed $(s^{-1})=(1-1/\text{draw ratio})$ draw speed/length of draw interval. If the deformation speed is too high, the fiber is broken before a sufficient draw ratio is achieved, and therefore it is not preferable. On the other hand, if the deformation speed of the fiber is too slow, the molecular chains are relaxed during the drawing, and a fiber having high physical properties cannot be obtained while being made thin by the drawing. As a result, when the fiber is formed into a braid, the tensile strength and the elastic modulus are lowered, and therefore it is not preferable.

The draw ratio of the undrawn filament is recommended to be not less than 10 times and not more than 60 times, preferably not less than 12 times and not more than 55 times, and furthermore preferably not less than 15 times and not more than 50 times, as a total draw ratio in both cases of one stage drawing and multistage drawing. In the drawing step, the polyethylene fiber is drawn under conditions of a temperature not higher than the melting point in one or more stages. When the drawing is carried out a plurality of stages, it is preferable that the temperature at the time of the drawing is higher as a later drawing stage. In the drawing temperature in the last stage of the drawing, the temperature of the polyethylene fiber is not lower than 80° C. and not higher than 160° C., and preferably not lower than 90° C. and not higher than 158° C. Conditions for a heating apparatus may be set so as to give the temperature to the polyethylene fiber at the time of the drawing. In this case, the filament temperature can be measured by using an infrared camera (SC 640, manufactured by FLIR systems).

Further, one of important constituents of the present invention is a method for drawing the undrawn filament in a solid state. As described above, not only the number of stages of drawing and the drawing temperature are important but also a particularly important factor is that the time required for deformation in a solid state is set to within 30 minutes. The time is preferably within 15 minutes and more preferably within 10 minutes. If the time required for deformation exceeds 30 minutes, the molecular chains in the inside of the fiber are relaxed even if prescribed conditions are maintained at the time of production as will be described below, so that the fibers cannot be fastened (shrunk) one another in the braid production step as a post-process, and therefore it is not preferable. The deformation time in the case of drawing in multistage is the time at the time of drawing in the latest step.

In the present invention, it is necessary not only for the bundling property among the fibers to be high before the braid production step, but also for the molecular chains in the inside of the polyethylene fiber to keep high bundling property after the braid production step. That is, it is important that the degree of crystallization is kept high, and the orientation to the fiber axial direction is not relaxed.

It is consequently possible to improve the bundling property among the fibers constituting the braid to some extent by increasing the degree of crystallization or degree of crystal orientation of the fiber to a certain extent by heat treatment in the braid production step as will be described below. However, if the degree of crystallization or the degree of crystal orientation is extremely increased by heat treatment in the braid production step, the fiber is shrunk significantly at the time of the heat treatment, and the braid is resultantly hard and therefore it is not preferable.

On the other hand, when conditions themselves are not proper such that the heat treatment after the braid production as will be described below is carried out at a high temperature and/or the treatment time is prolonged as well as tension is low, the molecular chains in the fiber are relaxed and the physical property of the resulting braid, particularly the bundling property of the braid, is consequently too low, and therefore it is not preferable.

An object of the present invention is to provide a braid which fluctuates little in strength change with the lapse of time for a long-term. As one of important factors of the present invention to accomplish the object, the drawn filament heated to not lower than 80° C. is cooled to 50° C. at a cooling speed of preferably not lower than 3° C./sec and not higher than 500° C./sec. The cooling speed is more preferably not lower than 10° C./sec and not higher than 400° C./sec, and furthermore preferably not lower than 20° C./sec and not higher than 300° C./sec. A residual strain caused at the time of drawing can be retained by cooling from the temperature at the time of drawing to 50° C. within a prescribed range of time. The temperature of 50° C. is sufficiently lower than the crystal dispersion temperature of the polyethylene fiber, and it is made possible to exhibit fastening of the fibers one another, which is important for the heat treatment in the braid production step as will be described below, by setting the temperature to not higher than 50° C. If the cooling speed for the drawn filament is lower than 3° C./sec, the molecular chains of the fiber are relaxed so that fastening among the fibers in the later braid production step become insufficient, and the braid to be obtained may have deteriorated dimensional stability, and therefore it is not preferable. On the other hand, if the cooling speed of the drawn filament after the drawing exceeds 500° C./sec, the residual strain in the drawn filament becomes too large after the cooling so that the braid after the braid production step may be consequently hard. Accordingly, the braid cannot be used in applications such as fishing lines for which flexibility is required, and therefore it is not preferable. As a cooling method, a water bath having not higher than 50° C. is available. As other cooling means, a cooling method may be available which brings the fiber into contact with a roller having a surface temperature of, for example, not higher than 50° C. In this case, a plurality of rollers adjusted so as to have a lower surface temperature as set in the later step may be used for cooling the fiber. For example, when the cooling is carried out by using three rollers each having different temperature, the fiber may be cooled through the surface temperature of the roller immediately after the drawing being adjusted to 80° C., the surface temperature of the second roller to 60° C., and the surface temperature of the third roller to 30° C. in this order. As other means, cold blow of air or an inert gas may be used and there is no particular limitation as long as the above-mentioned cooling speed is satisfied.

As one of important factors of the present invention, the cooled filament is wound up at a tension of preferably not less than 0.001 cN/dtex and not more than 7.0 cN/dtex, and more preferably not less than 0.05 cN/dtex and not more than 3.0 cN/dtex. It is made possible to wind up the polyethylene fiber with a residual strain retained by winding up the filament within the above-mentioned range. If the winding-up tension is less than 0.001 N/dtex, the residual strain is lowered and it is not preferable. On the other hand, if the winding-up tension is adjusted to more than 7.0 cN/dtex, monofilament of the fiber tend to be cut easily, and therefore it is not preferable. The fiber temperature at the time of winding up is preferably not higher than 60° C. The fiber temperature is more preferably not higher than 50° C., and furthermore preferably not higher than 45° C. If the temperature at the time of winding up exceeds 60° C., the residual strain fixed by the above-mentioned cooling step is relaxed, and therefore it is not preferable.

The polyethylene fiber has a maximum value of thermal shrinkage stress of not less than 0.05 cN/dtex and not more than 5.0 cN/dtex, more preferably not less than 0.10 cN/dtex and not more than 3.0 cN/dtex, and furthermore preferably not less than 0.20 cN/dtex and not more than 1.0 cN/dtex in the fiber state before processed into a braid. If the maximum value of thermal shrinkage stress is less than 0.05 cN/dtex, fastening of the fibers one another is weak even by the heat treatment step at the time of the braid production step, and it is not possible to keep stable tensile strength and elastic modulus in a wide range of temperature for product use, and therefore it is not preferable. On the other hand, if the maximum value of thermal stress exceeds 5.0 cN/dtex, the fibers are extremely strongly fastened one another and the bending rigidity is increased at the time of the heat treatment in the braid production step, so that the braid becomes hard and tends to have significant unevenness of fineness in the longitudinal direction, and therefore it is not preferable. The phrase "unevenness of fineness in the longitudinal direction" means CV % of fineness obtained by continuously sampling every 1 m of a braid in the longitudinal direction at 10 times and calculating the obtained each weight. The CV % is not more than 15%, preferably not more than 12%, and furthermore preferably not more than 8%. The equation for calculating the CV % is as follows:

$$CV\% \text{ (unevenness of fineness in longitudinal direction of braid)}=100\times(\text{standard deviation of fineness})/(\text{average value of fineness})$$

The temperature at which the maximum value of thermal shrinkage stress is indicated is preferably in a range of not lower than 80° C. and not higher than 160° C. The temperature is more preferably not lower than 85° C. and not higher than 150° C., and furthermore preferably not lower than 100° C. and not higher than 140° C. If the temperature at which the maximum value of thermal shrinkage stress is indicated is lower than 80° C., the time from the fiber production to the braid production becomes long, dimensional change and fluctuation of physical properties may be caused in the fiber state, and therefore it is not preferable. On the other hand, if the temperature at which the maximum value of thermal shrinkage stress is indicated exceeds 160° C., the heat treatment temperature at the time of braid processing step is required to be high and the braid tends to be broken easily in the processing step, and therefore it is not preferable.

The polyethylene fiber constituting a braid may be twisted, mixed with resin, or colored before processed into a braid or if necessary.

The braid of the present invention is preferable to be braided by not less than 3, that is, the braid is preferable to be constituted by not less than 3 fibers. If the number of the fiber is not more than 2, a braid-like shape cannot be formed and the contact surface area with a guide or the like is enlarged, so that the wear resistant performance is inferior and smoothness upon moving the braid is deteriorated. The braid of the present invention is required to have at least one high strength polyethylene fiber having physical properties of the present invention as a fiber constituting the braid. Use of the high strength polyethylene fiber as a fiber constituting the braid makes it possible to keep high strength and high elastic modulus and reduce the fluctuation of dimensional stability and the fluctuation of physical properties with the lapse of time. As long as at least one constituent fiber is a high strength polyethylene fiber, other fibers constituting the braid may be composited with fibers of other materials, for example, polyester fibers, polyamide fibers, liquid crystal polyester fibers, polypropylene fibers, acrylic fibers, aramid fibers, metal fibers, inorganic fibers, natural fibers, or recycled fibers. The fibers other than one high strength polyethylene fiber may be multifilaments, monofilaments, composites with short fibers, or split yarns produced by splitting tape-like or ribbon-like molded body of the polyethylene fiber itself. The single filament shape of each fiber may be circular or irregular, or may be selected from hollow, flat shape, and the like. The respective fibers may be partially or entirely colored or melt-bonded, and may be mixed with additives such as an antioxidant, a heat stabilizer, a flame retardant, a surfactant, a fluorescent brightening agent, a surface reforming agent, an antibacterial agent, a corrosion inhibitor, a wear-adjusting agent, an antistatic agent, a light-resistant stabilizer, an ultraviolet absorbent and a plasticizer, if necessary.

In the braid, a tensile strength is more preferably not less than 8 cN/dtex and furthermore preferably not less than 20 cN/dtex. The upper limit of the tensile strength is not particularly limited, but it is difficult to obtain a braid having a tensile strength exceeding 50 cN/dtex in terms of technique and industrial production. An initial elastic modulus is preferably not less than 150 cN/dtex and not more than 1800 cN/dtex. It is more preferably not less than 250 cN/dtex and not more than 1400 cN/dtex, and furthermore preferably not less than 350 cN/dtex and not more than 1300 cN/dtex. If the braid has the tensile strength and the initial elastic modulus as described above, changes in physical properties and shape by external force are hardly caused at the time of use as a product.

In the braid of the present invention, a stress at the time of 1% elongation is preferably not less than 0.5 cN/dtex and not more than 20 cN/dtex. It is more preferably not less than 0.8 cN/dtex and not more than 12 cN/dtex, and furthermore preferably not less than 1.0 cN/dtex and not more than 10 cN/dtex. If the stress at the time of 1% elongation is less than 0.5 cN/dtex, for example, when the braid is used for a fishing line, a bite of fish cannot be transmitted to fingers, and therefore it is not preferable. On the other hand, if the stress at the time of 1% elongation exceeds 15 cN/dtex, for example, when the braid is used for a fishing line, even slight disturbance is transmitted as stress to fingers so that it is difficult to distinguish a bite of fish from noise, and therefore it is not preferable.

In a method for braiding a braid of the present invention, a braiding angle is 6 to 35°, preferably 15 to 30°, and more preferably 18 to 25°. If the braiding angle is less than 6°, the braid form becomes unstable and the cross section tends to be flat easily. Further, the stiffness of the braid is low, and accordingly the performance as a product is significantly deteriorated. On the other hand, if the braiding angle exceeds 35°, the braid form is stabilized but the retention rate of the tensile force of a cord to the tensile force of an original filament is lowered, and therefore it is not preferable. In the present invention, the braiding angle is not limited to the range from 6 to 35°.

The braid of the present invention is produced by braiding not less than 3 fibers, but in the present invention, the number of the fiber is not particularly limited, and a braid produced by braiding not less than 3 and not more than 16 fibers is preferably used. As long as at least one polyethylene fiber described above is contained in the constituent fibers and the physical properties of the braid satisfy the above-mentioned ranges, the other constituent fibers may include long fibers, short fibers, or monofilaments of other materials. Examples of the other materials include not only organic fibers such as polyamide fibers, polyester fibers, liquid crystal polyester fibers, acrylic fibers and PBO fibers, but also metal fibers and inorganic fibers.

Further, one of important constituents of the present invention is a post-treatment method after the above-mentioned braid production step. Specifically, temperature, time, and tension at the time of subjecting the braid underwent the above-mentioned braiding step to a heat treatment step, and also temperature and tension at the time of winding step.

The heat treatment is carried out desirably at not lower than 70° C., preferably at 90° C., and more preferably at 100° C. for not shorter than 0.1 seconds and not longer than 30 minutes. The upper limit of the treatment temperature is not higher than 160° C. If the temperature for the heat treatment is lower than 70° C., it is close to the crystal dispersion temperature of the constituent polyethylene fiber, so that the fastening owing to the residual strain of the fiber becomes insufficient, and therefore it is not preferable. On the other hand, if the heat treatment temperature exceeds 160° C., not only breakage (thermal cutting) of the braid tends to be caused easily, but also it is not possible to obtain desired physical properties for the braid, and therefore it is not preferable. The treatment time is preferably not shorter than 0.5 seconds and not longer than 25 minutes, and more preferably not shorter than 1.0 second and not longer than 20 minutes. If the treatment time is shorter than 0.1 seconds, the fastening owing to the residual strain of the fiber becomes insufficient, and it is not preferable. On the other hand, if the heat treatment time exceeds 30 minutes, not only breakage of the braid tends to be caused easily, but also it is not possible to obtain desired physical properties for the braid, and therefore it is not preferable.

A tension applied to the braid at the time of heat treatment after the braid production, which is an important factor in the present invention, is preferably not less than 0.005 cN/dtex and not more than 15 cN/dtex. It is more preferably not less than 0.01 cN/dtex and not more than 12 cN/dtex, and furthermore preferably not less than 0.05 cN/dtex and not more than 8 cN/dtex. In the heat treatment step, it is important that the three factors, that is, the treatment temperature, the treatment time and the treatment tension, are adjusted to within the above-mentioned ranges in terms of obtaining the braid of the present invention. For example, if the tension during the treatment is higher than the above-mentioned range, the braid is broken while passing through the heat treatment step, or the physical properties of the braid to be obtained are lowered, or dimensional stability is lowered, or the fluctuation of the physical properties with the lapse of time becomes significant, and therefore it is not preferable.

A method for heat during heat treatment is not particularly limited. For example, hot water bath in which resin is dispersed or dissolved in water, oil bath, hot roller, radiation panel, steam jet, a hot pin and the like which are a known method are recommended, and the method is not limited in these. After or during the braid processing step, the braid may be twisted, mixed with resin, or colored if necessary. Further, during the heat treatment step, the braid may be subjected to re-drawing at a draw ratio of not less than 1.05 times and not more than 15 times. If the draw ratio in the re-drawing is less than 1.05 times, the braid is loosened in the heat treatment step, and therefore it is not preferable. On the other hand, if the draw ratio in the re-drawing exceeds 15 times, breakage of the fiber constituting the braid occurs, and therefore it is not preferable.

It is important to wind up the braid of the present invention at a temperature lower than the crystal dispersion temperature of the fiber constituting the braid by not lower than 5° C., preferably not lower than 10° C., and more preferably not lower than 20° C. If the temperature for winding is equal to or higher than the crystal dispersion temperature, residual strain is generated inside a product to be obtained, and dimensional change or fluctuation of physical properties is caused after making into a product, and therefore it is not preferable. Further, the shrinkage stress in the range from about room temperature to about crystal dispersion temperature of the fiber constituting the braid as the used environment temperature of the product becomes high, changes in physical properties and dimension may occur depending on the environment change, and further the limitation is caused such that the process condition of products and the used temperature range of the final products are restricted, and therefore it is not preferable. Specifically, it is preferable to wind up the braid at not higher than 50° C.

The braid of the present invention has a characteristic of small dimensional change even at high temperature. The shrinkage stress in a range of not lower than 30° C. and not higher than 80° C. is preferably not more than 5.0 cN/dtex, when measured by TMA. The shrinkage stress is more preferably not more than 0.8 cN/dtex, and furthermore preferably not less than 0.001 cN/dtex and not more than 0.7 cN/dtex. If the shrinkage stress exceeds 5.0 cN/dtex, the dimensional change becomes significant.

The braid of the present invention has a characteristic of small dimensional change even for long-term storage or long-term use. Specifically, the thermal shrinkage percentage is in a range from 0.45% to 8%, preferably not less than 0.5% and not more than 6.5%, and more preferably not less than 0.55% and not more than 4% even for continuous use under an environment of 80° C. for 240 hours. Accordingly, even when stored in a warehouse or inside a carrier for a long-term, the dimensional stability can be retained.

The braid of the present invention shows good physical property retention rate, that is, small fluctuation of tensile strength with the lapse of time, for a long-term. Specifically, the tensile strength retention rate is in a range from not less than 85% to 115%, preferably not less than 88% and not more than 112%, and more preferably not less than 90% and not more than 110% even for continuous use under an environment of 80° C. for 240 hours. Consequently, the fluctuation of the performance of products according to the environment change can be small in applications, as fiber-reinforced plastics, concrete-reinforcing fibers, ropes, and the like, in which a tensile force is high and change of an ambient temperature is large in a used state.

In the braid of the present invention, the characteristics of at least one polyethylene fiber constituting the braid are important in order to retain the dimensional stability and the physical property stabilization with the lapse of time as a braid after making into a product. It is because even if the above-mentioned braiding method for fiber is carried out, it is difficult to produce a braid having the characteristics of the present invention unless at least one polyethylene fiber constituting the braid has the following characteristics.

At least one polyethylene fiber constituting the braid product has a storage modulus of not less than 70 cN/dtex, preferably not less than 90 cN/dtex, and more preferably not less than 110 cN/dtex at not lower than 30° C. and not higher than 80° C., when measured by a solid viscoelasticity measurement apparatus after the polyethylene fiber is un-braided from the braid. If the storage modulus at not lower than 30° C. and not higher than 80° C. is less than 70 cN/dtex when measured by a solid viscoelasticity measurement apparatus after the polyethylene fiber is un-braided from the braid, the polyethylene fiber tends to be affected easily by external force applied at the time of product use so that dimensional change is caused during long-term product use, and therefore it is not preferable. On the other hand, the upper limit of the storage modulus at not lower than 30° C. and not higher than 80° C. is not more than 1500 cN/dtex, preferably not more than 1200 cN/dtex, and more preferably not more than 1000 cN/dtex. If the storage modulus at not lower than 30° C. and not higher than 80° C. exceeds 1500 cN/dtex, when the braid is used as a fishing line, even slight disturbance is transmitted as stress to fingers and it becomes difficult to distinguish a bite of fish from noise, and therefore it is not preferable. In addition, the fishing line gives rough and stiff feeling when wound on a reel due to loss of the ductility, and therefore it is not preferable. When the braid is used as a blind cord, the ductility is lost owing to the high storage modulus, and therefore it is not preferable.

At least one polyethylene fiber constituting the braid product has a shrinkage stress of preferably not more than 5.0 cN/dtex at not lower than 30° C. and not higher than 80° C., when measured by a thermo-mechanical analyzer (TMA) after the polyethylene fiber is un-braided from the braid. The shrinkage stress is more preferably not more than 0.8 cN/dtex, and furthermore preferably not less than 0.001 cN/dtex and not more than 0.7 cN/dtex. At least one polyethylene fiber constituting the braid product has a thermal shrinkage percentage of preferably not less than 0.45% and not more than 5.00% at 80° C. for 240 hours after the polyethylene fiber is un-braided from the braid. The thermal shrinkage percentage is more preferably not less than 0.48% and not more than 4.95%, and furthermore preferably not less than 0.50% and not more than 4.70%.

In the braid of the present invention, a specific gravity is preferably not less than 0.8 g/cm$^3$ and not more than 2.0 g/cm$^3$. The specific gravity is more preferably not less than 0.85 g/cm$^3$ and not more than 1.9 g/cm$^3$, and furthermore preferably not less than 0.90 g/cm$^3$ and not more than 1.7 g/cm$^3$. If the specific gravity is less than 0.8 g/cm$^3$, when the braid is used as a fishing line, the fishing line tends to be affected by tide, and therefore it is not preferable.

The braid of the present invention is preferable to have a loop strength retention rate of not less than 15% when measured in accordance with JIS L-1013. The loop strength retention rate is preferably not less than 20% and more preferably not less than 25%. The loop strength retention rate can be calculated according to the equation below:

Loop strength retention rate (%)=100×(loop strength)/(tensile strength)

The characteristic of the polyethylene fiber obtained in the present invention are measured and evaluated as follows.
(1) Intrinsic viscosity Decalin at a temperature of 135° C. was used to obtain various diluted solutions, and specific viscosities of the diluted solutions were measured by Ubbelohde capillary viscometer. An intrinsic viscosity was determined based on extrapolated points to an originating point of a straight line obtained by least squares approximation of the viscosities plotted against concentrations. When the measurement was performed, a sample was divided or cut into portions each having a length of about 5 mm, and 1 mass % of an antioxidant (trade name: "YOSHINOX BHT", manufactured by Yoshitomi Pharmaceutical Co., Ltd.) relative to a polymer was added, and stirred and dissolved at 135° C. for 24 hours, to prepare measurement solutions.
(2) Fineness Each sample was cut in 10 cm size at 5 different positions, the weights thereof were measured, and an average value of the weights was calculated to determine fineness.
(3) Tensile Strength, Elongation, and Elastic Modulus A measurements was carried out in accordance with JIS L1013 8.5.1. Regarding tensile strength and elastic modulus, a strain-stress curve was obtained, under the condition that a length of a sample was 200 mm (a length between chucks), and an elongation speed was 100%/min, an ambient temperature was 20° C., and a relative humidity was 65%, by using a "TENSILON Universal Material Testing Instrument" manufactured by ORIENTEC Co., LTD. A tensile strength (cN/dtex) and an elongation (%) were calculated based on a stress and an elongation at breaking point, and an elastic modulus (cN/dtex) was calculated from the tangent line providing a maximum gradient on the curve in the vicinity of the originating point. At this time, an initial load applied to the sample at the measurement was one tenth of fineness. An average of values obtained in ten measurements was used for each case.
(4) Measurement of Thermal Shrinkage Stress A thermal stress stain measurement apparatus (TMA/SS120C) manufactured by Seiko Instruments Inc. was used for the measurement. An initial load of 0.01764 cN/dtex was applied to a fiber having a length of 20 mm, and a temperature was increased from room temperature (20° C.) to the melting point at a temperature rising speed of 20° C./min to obtain thermal stress measurement results. A thermal shrinkage stress from 30° C. to 80° C. was measured from the measurement results.

(5) Specific Gravity

A specific gravity of the fiber was measured by using a density gradient tube method.
(Production of Density Gradient Tube)

Water was used as a heavy liquid, and isopropyl alcohol was used as a light liquid. While the light liquid was continuously and gradually mixed with the heavy liquid, they were poured into a glass tube having scale marks. The heavy liquid was in the bottom portion of the glass tube, and a proportion of the light liquid was increased toward the upper portion of the glass tube. Thus, a density gradient tube was produced. The density gradient tube was then put into a constant temperature oven having a temperature of 30° C.±0.1° C.

Next, five or more glass balls (having specific gravities different from each other) of which the specific gravities were known were carefully put into the density gradient tube having been produced, and they were allowed to stand as they were for one day. Thereafter, a distance between each glass ball and the liquid level was measured, and a graph (a calibration curve) in which the obtained distances were represented by the vertical axis, and values of the specific gravities of the glass balls were represented by the horizontal axis, was made. The graph represented a straight line, and it was confirmed that a correct specific gravity solution was obtained.

(Measurement of Specific Gravity)

Fiber (braid) samples (the lengths of the samples: 6 to 8 mm) were put into the density gradient tube having been produced as described above. Positions of each fiber sample from the liquid level were measured immediately after and five hours after the fiber sample was put into the density gradient tube. A value of the specific gravity at the position of each sample was obtained by using the calibration curve having been made when the density gradient tube was produced.
(6) Thermal Shrinkage Measurement A measurement was carried out in accordance with JIS L1013 8.18.2 dry thermal shrinkage percentage (b) method. Fiber samples and braid samples to be measured were each cut into a size of 70 cm, and positions distant from both ends, respectively, by 10 cm, were marked so as to show that a length of each sample was 50 cm. Next, the fiber samples and the braid samples were hung on so as to prevent a load from being applied thereto, and the fiber samples and the braid samples in this hanging state were heated at a temperature of 80° C. in a hot air circulating type heating furnace for 240 hours. Thereafter, the fiber samples were taken out of the heating furnace, and gradually cooled down sufficiently to room temperature. Thereafter, a length between the positions which had been marked on each fiber sample and braid sample at the beginning, was measured. The thermal shrinking percentage can be obtained by using the following equation.

Thermal shrinking percentage (%)=100×(lengths of fiber sample and braid sample before heating–lengths of fiber sample and braid sample after heating)/(lengths of fiber sample and braid sample before heating)

An average of values obtained in two measurements was used for each case.
(7) Storage Modulus at Not Lower than 30° C. and Not Higher than 80° C.

A solid viscoelasticity measurement apparatus (DMA Q800) manufactured by T. A. Instruments was used. The measurement condition was such that a length of a measurement sample was 10 mm. In the measurement, in order to prevent slipping between the fiber sample and chucks of the apparatus and separation of monofilaments after an original filament was un-braided from a braid, both ends of the fiber sample was each sandwiched by a cardboard by using an adhesive and a double-faced tape. Thus, the cardboards were placed between the fiber sample and the chucks of the apparatus in the measurement, thereby enabling reduction of slipping at the chucks of the apparatus and separation of monofilaments in the case of fiber. The measurement start temperature was set to −130° C., the measurement end temperature was set to 150° C., and a temperature rising rate was set to 1.0° C./min. A strain was set to 0.04%, an initial load at the start of the measurement was set to 0.1 cN/dtex, and force track was set to 350%. Further, a measurement frequency was 11 Hz. "T. A. Universal Analysis" manufactured by T. A. Instruments was used for data analysis. Storage modulus at not lower than 30° C. and not higher than 80° C. was measured under the above-mentioned conditions.

(8) Tensile Strength Retention Rate Under Environment of 80° C. for 240 Hours

After treated at a temperature of 80° C. in a heating furnace for 240 hours, each braid sample was cooled in a room at temperature of 20±2° C. for 24 hours or longer to measure strength in the same manner as in (3) above. A tensile strength retention rate was calculated according to the following equation.

Physical property retention rate under an environment of 80° C. for 240 hours (%)=100×(tensile strength after treatment at 80° C. for 240 hours/ tensile strength before treatment)

(9) Concentration of Residual Solvent

A concentration of a residual solvent in a fiber sample was measured by using a gas chromatography (manufactured by SHIMADZU CORPORATION). 10 mg of a sample fiber was set in a glass insert in a gas chromatography injector. The injector was heated to a temperature equal to or higher than the boiling point of the solvent, and the solvent vaporized due to the heating was introduced into a column by nitrogen purge. The temperature of the column was set to 40° C., and the solvent was trapped for 5 minutes. Next, the temperature of the column was increased to 80° C., and the measurement was then started. A concentration of the residual solvent was obtained from an obtained peak.

EXAMPLES

Hereinafter, the present invention will be described specifically with reference to examples, but the invention is not limited to these examples.

Example 1

A dispersion containing ultra high molecular weight polyethylene having an intrinsic viscosity of 17.0 dL/g and a weight average molecular weight of 2,800,000 and decalin was adjusted so as to have a polyethylene concentration of 9.0 wt %. This dispersion was converted into a solution at 205° C. by an extruder, and the obtained polyethylene solution was discharged from a spinneret having 30 holes each having an orifice diameter of ϕ1.0 mm at a nozzle surface temperature of 180° C. at 2.0 g/min of through put at single hole. Discharged filaments were deformed 16 times until the filaments were solidified, and then cooled in a cooling water bath at 30° C. to obtain undrawn filaments. The time required for the deformation is 0.1 minutes. Successively, the undrawn filaments were drawn 4.0 times while being dried by hot air at 120° C. The resulting filaments were drawn 4.1 times by hot air at 150° C. for 40 seconds, quick quenched by using water baths continuously, and then the drawn filaments were immediately wound up. In this case, the cooling speed to 50° C. was 20° C./sec. A temperature at the time of winding up the drawn filaments was set to 30° C. and a tension was set to 0.10 cN/dtex. These drawing steps were carried out continuously.

Four of the undrawn filaments were braided to produce a braid, and the braid was subjected to heat treatment at 144° C. and a tension of 1.900 cN/dtex for 4 minutes. In this case, the braid was subjected to the heat treatment while being drawn 2.1 times. After the heat treatment, the heat-treated braid was wound up at 32° C. The physical properties of the obtained fiber and braid are shown in Table 1 and Table 2.

Example 2

A braid was obtained in the same manner as in Example 1, except that the time until the filaments after drawing were put in the water bath for quick quenching was shortened, the cooling speed after drawing was changed to 50° C./sec, the winding up tension of the fiber was changed to 0.18 cN/dtex, the tension at the time of the heat treatment after braid formation was changed to 2.05 cN/dtex, the draw ratio at the time of the heat treatment for braid was changed to 2.4 times, and the heat-treated braid was wound up at 40° C. after the heat treatment. The physical properties of the obtained fiber and braid are shown in Table 1 and Table 2.

Example 3

A braid was obtained in the same manner as in Example 1, except that the polymer concentration was changed to 8 wt %, the deformation magnification and the deformation time at the time of spinning were changed to 24 times and 0.3 minutes, respectively, the draw ratio in the first stage was changed to 4.5 times, the draw ratio in the second stage was changed to 4.5 times, the drawing deformation time was changed to 38 seconds, the tension and the magnification at the time of the heat treatment after braid formation were changed to 3.95 cN/dtex and 1.8 times, respectively. The physical properties of the obtained fiber and braid are shown in Table 1 and Table 2.

Example 4

A braid was obtained in the same manner as in Example 1, except that cooling of the fiber after spinning and drawing was carried out using a roller at a cooling speed of 150° C./sec, and the heat treatment conditions after the braid formation were changed as follows: the heat treatment temperature was 149° C., the heat treatment time was 6 minutes, the tension at the time of the heat treatment was 2.10 cN/dtex, and the draw ratio at the time of the heat treatment was 1.9 times. The physical properties of the obtained fiber and braid are shown in Table 1 and Table 2.

Example 5

A braid was obtained in the same manner as in Example 1, except that ultra high molecular weight polyethylene having an intrinsic viscosity of 12.0 dL/g and a weight average molecular weight of 1,600,000 was used, the deformation magnification in the spinning step was changed to 20 times, the draw ratio in the first stage was changed to 3.0 times, the drawing temperature in the second stage was changed to 145° C., the draw ratio was changed to 3.5 times, the deformation speed was changed to 0.01 sec$^{-1}$, the time required for drawing in the second stage was changed to 2 minutes, cooling of the fiber after spinning and drawing was carried out using a roller at a cooling speed of 150° C./sec, and the heat treatment conditions after the braid formation were changed as follows: the heat treatment temperature was 140° C., the heat treatment time was 2 minutes, the tension at the time of the heat treatment was 1.30 cN/dtex, and the draw ratio at the time of the heat treatment was 1.8 times. The physical properties of the obtained fiber and braid are shown in Table 1 and Table 2.

Example 6

A braid was obtained in the same manner as in Example 1, except that ultra high molecular weight polyethylene having an intrinsic viscosity of 12.0 dL/g and a weight average molecular weight of 1,600,000 was used, paraffin was used as the solvent, and the polymer concentration was changed to 11.0 wt %; after the spinning step, hexane was used to remove the solvent, followed by drying; in the drawing step, the drawing temperature and the draw ratio in the first stage were changed to 80° C. and 1.3 times, the drawing temperature and the draw ratio in the second stage were changed to 130° C. and 3.5 times, the drawing temperature and the draw ratio in the third stage were changed to 150° C. and 2.8 times, the deformation speed in the third stage was changed to 0.018 sec$^{-1}$, and the time required for drawing in the third stage was changed to 2 minutes; cooling of the fiber after spinning and drawing was carried out using a roller at a cooling speed of 100° C./sec, and the fiber was wound up at a winding tension of 0.06 cN/dtex and a temperature at winding of 40° C.; and the heat treatment conditions after the braid formation was changed as follows: the heat treatment temperature was 152° C., the tension at the time of the heat treatment was 4.10 cN/dtex, and the draw ratio at the time of the heat treatment was 5.5 times. The physical properties of the obtained fiber and braid are shown in Table 1 and Table 2.

Comparative Example 1

A dispersion containing ultra high molecular weight polyethylene having an intrinsic viscosity of 17.0 dL/g and a weight average molecular weight of 2,800,000 and decalin was adjusted so as to have a polyethylene concentration of 9.0 wt %. This dispersion was converted into a solution at 205° C. by an extruder, and the obtained polyethylene solution was discharged from a spinneret having 30 holes each having an orifice diameter of ϕ1.0 mm at a nozzle surface temperature of 180° C. at 2.0 g/min of through put at single hole. Discharged filaments were deformed 16 times until the filaments were solidified, and then cooled in a cooling water bath at 30° C. to obtain undrawn filaments. The time required for the deformation is 0.1 minutes. The undrawn filaments were continuously drawn 4.0 times while being dried by hot air at 120° C. The resulting filaments were drawn 4.1 times by hot air at 150° C. for 40 seconds, quick quenched by using water baths continuously, and then the drawn filaments were immediately wound up. In this case, the cooling speed to 50° C. was 1.5° C./sec. A temperature at the time of winding up the drawn filaments was set to 30° C. and a tension was set to 0.10 cN/dtex. Four of the undrawn filaments were braided to produce a braid, and the braid was subjected to heat treatment at 60° C. and a tension of 0.004 cN/dtex for 4 minutes. In this case, the braid was subjected to the heat treatment while being drawn 2.1 times. After the heat treatment, the heat-treated braid was wound up at 32° C. The physical properties of the obtained fiber and braid are shown in Table 1 and Table 2.

Comparative Example 2

A braid was obtained in the same manner as in Comparative Example 1, except that the cooling speed of the fiber to 50° C. was changed to 20.0° C./sec after the drawing step, four of the undrawn filaments were braided to produce a braid, and the braid was subsequently subjected to heat treatment at 120° C. with a tension of 0.004 cN/dtex for 35 minutes. The physical properties of the obtained fiber and braid are shown in Table 1 and Table 2.

Comparative Example 3

A braid was obtained in the same manner as in Comparative Example 1, except that the cooling speed of the fiber was changed to 520° C./sec after the drawing step, four of the undrawn filaments were braided to produce a braid, and the braid was subsequently drawn 2.1 times at 150° C. and at a tension of 1.90 cN/dtex. In this case, the braid was subjected to heat treatment while being drawn 2.1 times. The physical properties of the obtained fiber and braid are shown in Table 1 and Table 2.

Comparative Example 4

Without using a solvent, high density polyethylene having an intrinsic viscosity of 2 dL/g and a weight average molecular weight of 130,000 was melted at 285° C. by an extruder, and the polyethylene solution was discharged from a spinneret having 30 holes each having an orifice diameter of ϕ 0.5 mm at a nozzle surface temperature of 280° C. at 0.5 g/min of through put at single hole. Discharged filaments were deformed 130 times until the filaments were solidified, and then cooled by cooling air blow at 30° C. to obtain undrawn filaments. The time required for the deformation is 0.3 minutes. The undrawn filaments were continuously drawn 2.0 times while being dried by hot air at 80° C. The resulting filaments were drawn 5.0 times by hot air at 100° C. for 30 seconds, quick quenched by using water baths continuously, and then the drawn filaments were immediately wound up. In this case, the cooling speed to 50° C. was 520° C./sec. A temperature at the time of winding up the drawn filaments was set to 30° C. and a tension was set to 0.10 cN/dtex. Four of the undrawn filaments were braided to produce a braid, and the braid was subjected to heat treatment at 80° C. and a tension of 0.008 cN/dtex for 4 minutes. In this case, the braid was subjected to the heat treatment while being drawn 2.1 times. After the heat treatment, the heat-treated braid was wound up at 32° C. The physical properties of the obtained fiber and braid are shown in Table 1 and Table 2.

Comparative Example 5

Without using a solvent, high density polyethylene having an intrinsic viscosity of 1.5 dL/g and a weight average molecular weight of 95,000 was melted at 280° C. by an extruder, and the polyethylene solution was discharged from a spinneret having 30 holes each having an orifice diameter of ϕ 0.5 mm at a nozzle surface temperature of 280° C. at 0.5 g/min of through put at single hole. Discharged filaments were deformed 130 times until the filaments were solidified, and then cooled by cooling air blow at 30° C. to obtain undrawn filaments. The time required for the deformation is 0.3 minutes. The undrawn filaments were continuously drawn 2.0 times while being dried by hot air at 80° C. The resulting filaments were drawn 5.0 times by hot air at 100° C. for 30 seconds, quick quenched by using water baths continuously, and then the drawn filaments were immediately wound up. In this case, the cooling speed to 50° C. was 520° C./sec. A temperature at the time of winding up the drawn filaments was set to 30° C. and a tension was set to 0.10 cN/dtex. Four of the undrawn filaments were braided to produce a braid, and the braid was subjected to heat treatment at 80° C. and a tension of 0.008 cN/dtex for 4 minutes. In this case, the braid was subjected to the heat treatment while being drawn 2.1 times. After the heat treatment, the heat-treated braid was wound up at 32° C. The physical properties of the obtained fiber and braid are shown in Table 1 and Table 2.

TABLE 1

| | | unit | Example 1 | Example 2 | Example 3 | Example 4 | Example 5 | Example 6 |
|---|---|---|---|---|---|---|---|---|
| characteristic of raw material | intrinsic viscosity | [dL/g] | 17 | 17 | 17 | 17 | 12 | 17 |
| | weight average molecular weight | [g/mol] | 2,800,000 | 2,800,000 | 2,800,000 | 2,800,000 | 1,600,000 | 1,600,000 |
| spinning method | | — | solution spinning | solution spinning | solution spinning | solution spinning | solution spinning | |
| method for producing a fiber | | | | | | | | |
| | kind of solvent | | decalin | decalin | decalin | decalin | decalin | paraffin |
| | polymer concentration | | 9.0 | 9.0 | 8.0 | 9.0 | 9.0 | 11.0 |
| | extrusion temperature | [° C.] | 205 | 205 | 205 | 205 | 205 | 205 |
| | mesh size of nozzle filter | [µm] | 100 | 100 | 100 | 100 | 100 | 100 |
| | pressure on filter part | [MPa] | 5.0 | 5.0 | 5.0 | 5.0 | 5.0 | 5.0 |
| | nozzle orifice diameter | [mm] | 1.0 | 1.0 | 1.0 | 1.0 | 1.0 | 1.0 |
| | nozzle temperature | [° C.] | 180 | 180 | 180 | 180 | 180 | 180 |
| | through put at single hole | [g/min] | 2.0 | 2.0 | 2.0 | 2.0 | 2.0 | 2.0 |
| | cooling method | | cooling water bath | cooling water bath | cooling water bath | cooling water bath | cooling water bath | cooling water bath |
| | deformation ratio at the time of spining | [times] | 16 | 16 | 24 | 16 | 20 | 16 |
| | deformation time at the time of spinning | [min] | 0.1 | 0.1 | 0.3 | 0.1 | 0.1 | 0.1 |
| | first stage drawing temperature | [° C.] | 120 | 120 | 120 | 120 | 120 | 80 |
| | draw ratio | [times] | 4.0 | 4.0 | 4.5 | 4.0 | 3.0 | 1.3 |
| | second stage drawing temperature | [° C.] | 150 | 150 | 150 | 150 | 145 | 130 |
| | draw ratio | [times] | 4.1 | 4.1 | 4.5 | 4.1 | 3.5 | 3.5 |
| | third stage drawing temperature | [° C.] | | | | | | 150 |
| | draw ratio | [times] | | | | | | 2.8 |
| | deformation speed | [sec⁻¹] | 0.018 | 0.018 | 0.018 | 0.018 | 0.010 | 0.018 |
| | stretching deformation ratio | [times] | 16.4 | 16.4 | 20.3 | 16.4 | 10.5 | 12.7 |
| | drawing temperature in the last stage of the stretching | [° C.] | 150 | 150 | 150 | 150 | 145 | 150 |
| | drawing deformation time in the last stage of the stretching | [min] | 40 sec | 40 sec | 38 sec | 40 sec | 2 min | 2 min |
| | cooling speed to 50° C. | [° C./sec] | 20.0 | 50.0 | 20.0 | 150.0 | 150.0 | 100.0 |
| | winding-up tension | [cN/dtex] | 0.10 | 0.18 | 0.10 | 0.10 | 0.10 | 0.06 |
| | winding-up temperature | [° C.] | 30 | 30 | 30 | 30 | 30 | 40 |
| property | intrinsic viscosity | [dL/g] | 16.0 | 16.0 | 16.0 | 16.0 | 11.5 | 11.6 |
| | tensile strength | [cN/dtex] | 34.3 | 35.3 | 38.6 | 34.6 | 21.1 | 23.5 |
| | elastic modulus | [cN/dtex] | 1235 | 1253 | 1356 | 1295 | 533 | 800 |
| | maximum value of thermal shrinkage stress | [cN/dtex] | 0.55 | 0.56 | 0.58 | 0.61 | 0.25 | 0.36 |
| | temperature at which the maximum value of thermal shrinkage stress | [° C.] | 148 | 149 | 149 | 148 | 148 | 149 |
| | concentration of a resident solvent | [ppm] | 2824 | 2301 | 3011 | 2756 | 805 | 1011 |

| | | unit | Comparative Example 1 | Comparative Example 2 | Comparative Example 3 | Comparative Example 4 | Comparative Example 5 |
|---|---|---|---|---|---|---|---|
| characteristic of raw material | intrinsic viscosity | [dL/g] | 17 | 17 | 17 | 2 | 1.5 |
| | weight average molecular weight | [g/mol] | 2,800,000 | 2,800,000 | 2,800,000 | 130,000 | 95,000 |
| spinning method | | — | solution spinning | solution spinning | solution spinning | melt spinning | melt spinning |
| method for producing a fiber | | | | | | | |
| | kind of solvent | | decalin | decalin | decalin | — | — |
| | polymer concentration | | 9.0 | 9.0 | 9.0 | 100.0 | 100.0 |
| | extrusion temperature | [° C.] | 205 | 205 | 205 | 285 | 280 |
| | mesh size of nozzle filter | [µm] | 650 | 100 | 100 | 20 | 20 |
| | pressure on filter part | [MPa] | 5.0 | 5.0 | 5.0 | 35.0 | 35.0 |
| | nozzle orifice diameter | [mm] | 1.0 | 1.0 | 1.0 | 0.5 | 0.5 |

TABLE 1-continued

|  |  |  |  |  |  |  |  |
|---|---|---|---|---|---|---|---|
|  | nozzle temperature | [° C.] | 180 | 180 | 180 | 280 | 280 |
|  | through put at single hole | [g/min] | 2.0 | 2.0 | 2.0 | 0.5 | 0.5 |
|  | cooling method |  | cooling water bath | cooling water bath | cooling water bath | cooling air | cooling air |
|  | deformation ratio at the time of spining | [times] | 16 | 16 | 16 | 130 | 130 |
|  | deformation time at the time of spinning | [min] | 0.1 | 0.1 | 0.1 | 0.3 | 0.3 |
|  | first stage drawing temperature | [° C.] | 120 | 120 | 120 | 80 | 80 |
|  | draw ratio | [times] | 4.0 | 4.0 | 4.0 | 2.0 | 2.0 |
|  | second stage drawing temperature | [° C.] | 150 | 150 | 150 | 100 | 100 |
|  | draw ratio | [times] | 4.1 | 4.1 | 4.1 | 5.0 | 5.0 |
|  | third stage drawing temperature | [° C.] |  |  |  |  |  |
|  | draw ratio | [times] |  |  |  |  |  |
|  | deformation speed | [sec$^{-1}$] | 0.018 | 0.018 | 0.018 | 0.020 |  |
|  | stretching deformation ratio | [times] | 16.4 | 16.4 | 16.4 | 10.0 | 10.0 |
|  | drawing temperature in the last stage of the stretching | [° C.] | 150 | 150 | 150 | 100 | 100 |
|  | drawing deformation time in the last stage of the stretching | [min] | 40 sec | 40 sec | 40 sec | 30 sec | 30 sec |
|  | cooling speed to 50° C. | [° C./sec] | 1.5 | 20.0 | 520.0 | 520.0 | 520.0 |
|  | winding-up tension | [cN/dtex] | 0.10 | 0.10 | 0.10 | 0.10 | 0.10 |
|  | winding-up temperature | [° C.] | 30 | 30 | 30 | 30 | 30 |
| property | intrinsic viscosity | [dL/g] | 16.0 | 16.0 | 16.0 | 1.8 | 1.7 |
|  | tensile strength | [cN/dtex] | 19.8 | 34.2 | 34.4 | 12.5 | 8.2 |
|  | elastic modulus | [cN/dtex] | 433 | 1215 | 1315 | 460 | 380 |
|  | maximum value of thermal shrinkage stress | [cN/dtex] | 0.04 | 0.55 | 1.25 | 0.65 | 0.59 |
|  | temperature at which the maximum value of thermal shrinkage stress | [° C.] | 147 | 148 | 148 | 98 | 98 |
|  | concentration of a resident solvent | [ppm] | 2023 | 2711 | 2855 | 0 | 0 |

TABLE 2

|  |  |  | unit | Example 1 | Example 2 | Example 3 | Example 4 | Example 5 | Example 6 |
|---|---|---|---|---|---|---|---|---|---|
| braid | production method | heat treatment temperature | [° C.] | 144 | 144 | 144 | 149 | 140 | 152 |
|  |  | heat treatment time | [min] | 4 min | 4 min | 4 min | 6 min | 2 min | 4 min |
|  |  | tension at the time of heat treatment | [cN/dtex] | 1.900 | 2.050 | 3.950 | 2.100 | 1.300 | 4.100 |
|  |  | draw ratio | [times] | 2.1 | 2.4 | 1.8 | 1.9 | 1.8 | 5.5 |
|  |  | winding-up temperature | [° C.] | 32 | 32 | 32 | 32 | 32 | 32 |
|  | property | tensile strength | [cN/dtex] | 22.8 | 24.9 | 27.1 | 24.8 | 12.5 | 23.8 |
|  |  | stress at the time of 1% elongation | [cN/dtex] | 10 | 10.3 | 11.3 | 10 | 6.3 | 10.5 |
|  |  | elastic modulus | [cN/dtex] | 855 | 880 | 1011 | 953 | 260 | 1151 |
|  |  | loop strength retention rate | [%] | 38 | 39 | 38 | 38 | 42 | 42 |
|  |  | specific gravity | [g/cm$^3$] | 0.960 | 0.960 | 0.970 | 0.960 | 0.960 | 0.970 |
|  |  | the number of braided fiber | | 4 | 4 | 4 | 4 | 4 | 4 |
|  |  | mixed with resin | | olefin | olefin | olefin | olefin | olefin | olefin |
|  |  | unevenness of fineness in longitudinal direction | [%] | 5.3 | 5.2 | 1.3 | 5.3 | 6.9 | 8.5 |
|  |  | storage modulus at no lower than 30° C. and not higher than 80° C. | [%] | 85 | 85 | 86 | 90 | 75 | 81 |
|  |  | thermal shrinkage stress at 30-80° C. | [cN/dtex] | 0.42 | 0.41 | 0.42 | 0.21 | 0.54 | 0.44 |
|  |  | thermal shrinkage at 80° C. for 240 hours | [%] | 1.22 | 1.20 | 1.20 | 0.95 | 3.66 | 1.33 |

TABLE 2-continued

| | | | | | | | | |
|---|---|---|---|---|---|---|---|---|
| property of fiber after the braid is un-braided | tensile strength retention rate at 80° C. for 240 hours | [%] | 95 | 101 | 98 | 104 | 86 | 95 |
| | storage modulus at not lower than 30° C. and not higher than 80° C. | [%] | 87 | 86 | 88 | 89 | 72 | 82 |
| | thermal shrinkage stress at 30-80° C. | [cN/dtex] | 0.43 | 0.42 | 0.45 | 0.25 | 0.59 | 0.51 |
| | thermal shrinkage at 80° C. for 240 hours | [%] | 1.24 | 1.36 | 1.28 | 1.09 | 4.13 | 1.36 |

| | | | unit | Comparative Example 1 | Comparative Example 2 | Comparative Example 3 | Comparative Example 4 | Comparative Example 5 |
|---|---|---|---|---|---|---|---|---|
| braid | production method | heat treatment temperature | [° C.] | 60 | 120 | 150 | 80 | 80 |
| | | heat treatment time | [min] | 4 min | 35 min | 4 min | 4 min | 4 min |
| | | tension at the time of heat treatment | [cN/dtex] | 0.004 | 0.004 | 1.900 | 0.008 | 0.008 |
| | | draw ratio | [times] | 2.1 | 2.1 | 2.1 | 2.1 | 2.1 |
| | | winding-up temperature | [° C.] | 32 | 32 | 32 | 32 | 32 |
| | property | tensile strength | [cN/dtex] | 7.2 | 11.0 | 23.3 | 7.5 | 7.2 |
| | | stress at the time of 1% elongation | [cN/dtex] | 0.4 | 0.4 | 11.2 | 0.4 | 0.3 |
| | | elastic modulus | [cN/dtex] | 140 | 145 | 895 | 140 | 130 |
| | | loop strength retention rate | [%] | 35 | 40 | 38 | 41 | 33 |
| | | specific gravity | [g/cm³] | 0.960 | 0.960 | 0.960 | 0.960 | 0.950 |
| | | the number of braided fiber | | 4 | 4 | 4 | 4 | 4 |
| | | mixed with resin | | olefin | olefin | olefin | olefin | olefin |
| | | unevenness of fineness in longitudinal direction | [%] | 22.3 | 13.8 | 19.3 | 2.2 | 4.1 |
| | | storage modulus at not lower than 30° C. and not higher than 80° C. | [%] | 35 | 31 | 33 | 38 | 36 |
| | | thermal shrinkage stress at 30-80° C. | [cN/dtex] | 0.006 | 0.005 | 5.13 | 0.21 | 0.20 |
| | | thermal shrinkage at 80° C. for 240 hours | [%] | 0.13 | 0.10 | 8.65 | 8.86 | 8.92 |
| | | tensile strength retention rate at 80° C. for 240 hours | [%] | 61 | 65 | 78 | 65 | 65 |
| property of fiber after the braid is un-braided | | storage modulus at not lower than 30° C. and not higher than 80° C. | [%] | 36 | 33 | 35 | 37 | 37 |
| | | thermal shrinkage stress 30-80° C. | [cN/dtex] | 0.005 | 0.004 | 5.11 | 0.21 | 0.20 |
| | | thermal thickness at 80° C. for for 240 hours | [%] | 0.24 | 0.20 | 8.44 | 8.95 | 8.98 |

INDUSTRIAL APPLICABILITY

The braid of the present invention is suitable not only for long-term storage but also for long-term use application, and exhibits excellent performance for use as fishing lines, various kinds of interior cords and nets such as blind cords, pleated cords, pleated screen door cords, curtain chords and shading screens, all of which being required for moving up and down and opening and closing, fenders, surgical sutures, fastening filaments for meat, safety gloves, safety ropes, ropes for fishery industries, finishing ropes, archery chords, etc. The braid of the invention is further widely usable in industrial application not only for use as the above-mentioned molded products but also as base materials for collecting organic and inorganic matters by making composites with various kinds of materials as well as water-retaining base materials.

The invention claimed is:

1. A braid comprising a polyethylene fiber or polyethylene tape which has an intrinsic viscosity [η] of not less than 5.0 dL/g and not more than 30 dL/g and contains not less than 90% of ethylene as a repeating unit thereof,
    wherein a thermal shrinkage percentage is not less than 0.45% and not more than 8% under an environment of 80° C. for 240 hours,
    wherein the braid does not include a core, and wherein all the polyethylene fibers or all the polyethylene tapes constituting the braid are braided to produce a braid simultaneously.

2. A braid comprising a polyethylene fiber or polyethylene tape which has an intrinsic viscosity [η] of not less than 5.0 dL/g and not more than 30 dL/g and contains not less than 90% of ethylene as a repeating unit thereof, wherein
a tensile strength retention rate is not less than 85% and not more than 115% under an environment of 80° C. for 240 hours, and
wherein the braid does not include a core.

3. The braid according to claim 1, wherein a stress at the time of 1% elongation is not less than 0.5 cN/dtex and not more than 20 cN/dtex.

4. The braid according to claim 1, wherein a thermal shrinkage stress at not lower than 30° C. and not higher than 80° C. is not more than 5.0 cN/dtex when measured by a thermo-mechanical analyzer (TMA).

5. The braid according to claim 1, wherein a loop strength retention rate is not less than 15% when measured in accordance with JIS L-1013.

6. The braid according to claim 1, wherein the braid is constituted from not less than 3 yarns and at least one yarn constituting the braid is a polyethylene fiber.

7. A braid constituted from at least one polyethylene fiber having an intrinsic viscosity [η] of not less than 5.0 dL/g and not more than 30 dL/g, comprising not less than 90% of ethylene as a repeating unit thereof, and having a storage modulus at not lower than 30° C. and not higher than 80° C. of not less than 70 cN/dtex when measured by a solid viscoelasticity measurement apparatus after the braid is un-braided,
wherein the braid does not include a core.

8. A braid constituted from at least one polyethylene fiber having an intrinsic viscosity [η] of not less than 5.0 dL/g and not more than 30 dL/g, comprising not less than 90% of ethylene as a repeating unit thereof, and having a thermal shrinkage stress at not lower than 30° C. and not higher than 80° C. of not more than 5.0 cN/dtex when measured by a thermo-mechanical analyzer (TMA) after the braid is un-braided,
wherein the braid does not include a core.

9. The braid according to claim 1, wherein a specific gravity is not less than 0.80 and not more than 2.0 and an average tensile strength is not less than 8 cN/dtex and not more than 50 cN/dtex.

10. The braid according to claim 9, wherein the braid is colored.

11. The braid according to claim 1, wherein the braid is drawn at a draw ratio of not less than 1.05 times and not more than 15.0 times at not higher than 160° C. after braid production.

12. A fishing line using the braid according to claim 1.

13. A rope using the braid according to claim 1.

14. A method for producing a braid, comprising spinning a polyethylene which has an intrinsic viscosity [η] of not less than 5.0 dL/g and not more than 30 dL/g and contains not less than 90% of ethylene as a repeating unit thereof,
drawing the polyethylene at temperature of not lower than 80° C. to make a drawn filament,
cooling the drawn filament at a cooling speed of not lower than 3° C./sec,
winding up the obtained drawn filament at a tension of 0.001 to 7 cN/dtex to prepare a polyethylene fiber,
twisting the polyethylene fiber if necessary, and
adjusting, in a subsequent braid production step, a time for heating the polyethylene fiber constituting the braid to a temperature of not lower than 70° C. to not longer than 30 minutes and a tension applied to the polyethylene fiber during the heating to not less than 0.005 cN/dtex and not more than 15 cN/dtex.

* * * * *